(12) United States Patent
Oka

(10) Patent No.: US 10,788,406 B2
(45) Date of Patent: Sep. 29, 2020

(54) CHEMICAL SUBSTANCE CONCENTRATOR AND CHEMICAL SUBSTANCE DETECTOR

(71) Applicant: Panasonic Corporation, Osaka (JP)

(72) Inventor: Hiroaki Oka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 223 days.

(21) Appl. No.: 15/758,738

(22) PCT Filed: Dec. 9, 2016

(86) PCT No.: PCT/JP2016/005092
§ 371 (c)(1),
(2) Date: Mar. 9, 2018

(87) PCT Pub. No.: WO2017/104120
PCT Pub. Date: Jun. 22, 2017

(65) Prior Publication Data
US 2018/0252624 A1 Sep. 6, 2018

(30) Foreign Application Priority Data
Dec. 14, 2015 (JP) .................................. 2015-242819

(51) Int. Cl.
*G01N 1/40* (2006.01)
*B01D 53/04* (2006.01)
(Continued)

(52) U.S. Cl.
CPC ............. *G01N 1/405* (2013.01); *B01D 53/04* (2013.01); *B01D 53/0438* (2013.01);
(Continued)

(58) Field of Classification Search
CPC . G01N 1/405; G01N 1/40; G01N 1/28; B01D 53/04; B01D 53/02; B01D 53/00
(Continued)

(56) References Cited

U.S. PATENT DOCUMENTS 4,759,210 A * 7/1988 Wohltjen ............... G01N 30/00
422/88
6,097,011 A 8/2000 Gadkaree et al.
(Continued)

FOREIGN PATENT DOCUMENTS

CN      1809745 A    7/2006
CN    103380362 A   10/2013
(Continued)

OTHER PUBLICATIONS

International Search Report of PCT application No. PCT/JP2016/005092 dated Feb. 28, 2017.
(Continued)

*Primary Examiner* — Christine T Mui
(74) *Attorney, Agent, or Firm* — McDermott Will & Emery LLP

(57) ABSTRACT

A chemical substance concentrator includes a channel allowing a sample containing a chemical substance to flow in a flowing direction in the channel, and a cell wall partitioning the channel into adsorption cells. Each of adsorption cells includes first and second electrodes disposed on the cell wall apart from each other and an adsorption device that adsorbs the chemical substance. The adsorption device contains metal oxide. The absorption device is disposed at a position contacting the first electrode and the second electrode such that the first and second electrodes are electrically connected via the adsorption device.

13 Claims, 13 Drawing Sheets

(51) Int. Cl.
*B01J 20/06* (2006.01)
*B01J 20/28* (2006.01)
*G01N 1/22* (2006.01)

(52) U.S. Cl.
CPC ......... *B01J 20/06* (2013.01); *B01J 20/28045* (2013.01); *G01N 1/2214* (2013.01); *B01D 53/0462* (2013.01); *B01D 2253/1124* (2013.01); *B01D 2253/30* (2013.01); *B01D 2253/3425* (2013.01); *B01D 2257/304* (2013.01); *B01D 2257/306* (2013.01); *B01D 2257/708* (2013.01); *B01D 2257/7027* (2013.01); *B01D 2258/012* (2013.01); *B01D 2258/0266* (2013.01); *B01D 2258/06* (2013.01); *B01D 2259/40096* (2013.01)

(58) Field of Classification Search
USPC .... 422/83, 88; 73/23.2, 31.01, 31.02, 31.05, 73/31.07
See application file for complete search history.

(56) References Cited

U.S. PATENT DOCUMENTS

| | | |
|---|---|---|
| 6,824,689 B2 | 11/2004 | Wang et al. |
| 2004/0100269 A1 | 5/2004 | Cole et al. |
| 2005/0245836 A1 | 11/2005 | Star et al. |
| 2006/0000772 A1 | 1/2006 | Sano et al. |
| 2006/0133975 A1* | 6/2006 | Yamanaka ............... A61L 9/014 423/210 |
| 2006/0134883 A1 | 6/2006 | Hantschel et al. |
| 2008/0067618 A1 | 3/2008 | Wang et al. |
| 2008/0093226 A1 | 4/2008 | Briman et al. |
| 2009/0018668 A1 | 1/2009 | Galbraith |
| 2009/0282899 A1 | 11/2009 | Nam et al. |
| 2009/0317916 A1 | 12/2009 | Ewing et al. |
| 2010/0213954 A1 | 8/2010 | Yao |
| 2012/0119760 A1 | 5/2012 | Pehrsson et al. |
| 2012/0223226 A1 | 9/2012 | Rafferty et al. |
| 2013/0152787 A1 | 6/2013 | Boulet et al. |
| 2015/0200083 A1* | 7/2015 | Brown ................. H01J 49/049 250/282 |
| 2017/0212069 A1* | 7/2017 | Nakao ..................... B01J 20/02 |

FOREIGN PATENT DOCUMENTS

| | | | |
|---|---|---|---|
| JP | S61286742 A | 12/1986 | |
| JP | 2-307527 | 12/1990 | |
| JP | 8-052318 | 2/1996 | |
| JP | H10227725 A | 8/1998 | |
| JP | 2001296218 A | 10/2001 | |
| JP | 20020518668 A | 6/2002 | |
| JP | 2004148211 A | 5/2004 | |
| JP | 2006187857 A | 7/2006 | |
| JP | 2010197387 A | 9/2010 | |
| JP | 2013-010090 | 1/2013 | |
| JP | 2013-540573 | 11/2013 | |
| JP | 2014504740 A | 2/2014 | |
| JP | 2014-258325 | * 12/2014 | ............... G01N 1/40 |
| JP | 2015-242819 | * 9/2018 | ............. B01D 53/04 |
| WO | 1999066304 A1 | 12/1999 | |
| WO | 2009104202 A1 | 8/2009 | |
| WO | 2016/103561 A1 | 6/2016 | |

OTHER PUBLICATIONS

English Translation of Chinese Search Report dated Sep. 25, 2019, for the related Chinese Patent Application No. 201680037023.7.
The Extended European Search Report dated Sep. 13, 2018, for the related European Patent Application No. 16845916.2.
Keat Ghee Ong et al., "A Wireless, Passive Carbon Nanotube-Based Gas Sensor", IEEE Sensors Journal, IEEE Service Center, New York, NY, US, vol. 2, No. 2, Apr. 1, 2002 (Apr. 1, 2002), XP011065645.
International Search Report issued in related International Application No. PCT/JP2016/004053, dated Nov. 22, 2016.
Non-final Office Action issued in related U.S. Appl. No. 15/574,577, dated Nov. 22, 2019.
Final Office Action issued in related U.S. Appl. No. 15/574,577, dated Aug. 28, 2019.
Non-final Office Action issued in related U.S. Appl. No. 15/574,577, dated Apr. 1, 2019.
Final Office Action issue in U.S. Appl. No. 15/574,577, dated Apr. 23, 2020.
English Translation of Chinese Search Report dated Jul. 3, 2020 for the related Chinese Patent Application No. 201680057791.9.

* cited by examiner

CHEMICAL SUBSTANCE CONCENTRATOR AND CHEMICAL SUBSTANCE DETECTOR

This application is a U.S. national stage application of the PCT international application No.PCT/JP2016/005092 filed on Dec. 9, 2016, which claims the benefit of foreign priority of Japanese patent application No. 2015-242819 filed on Dec. 14, 2015, the contents all of which are incorporated herein by reference.

TECHNICAL FIELD

The present disclosure relates to a chemical substance concentrator for concentrating a chemical substance included in a sample and also relates to a chemical substance detector.

BACKGROUND ART

In terms of the technique to concentrate a chemical substance in a gas, for example, PTL 1 discloses an adsorption-separation system that adsorbs a chemical substance. The adsorption-separation system includes an adsorption material and a parallel flow passage with a cell wall having a thermally-conductive filament. The adsorption material is disposed in a cell in the parallel flow passage. Besides, the adsorption material directly contacts the thermally-conductive filament.

The chemical substance in a gas is adsorbed to the adsorption material in the cell, while the adsorbed chemical substance is desorbed from the adsorption material by heat transfer along the thermally-conductive filament.

CITATION LIST

Patent Literature

PTL 1: Japanese Patent Laid-Open Publication No. 2013-540573

SUMMARY

A chemical substance concentrator includes a channel allowing a sample containing a chemical substance to flow in a flowing direction in the channel, and a cell wall partitioning the channel into adsorption cells. Each of adsorption cells includes first and second electrodes disposed on the cell wall apart from each other and an adsorption device that adsorbs the chemical substance. The adsorption device contains metal oxide. The absorption device is disposed at a position contacting the first electrode and the second electrode such that the first and second electrodes are electrically connected via the adsorption device.

This chemical substance concentrator satisfactorily desorbs the chemical substance adsorbed by the adsorption device.

DETAIL DESCRIPTION OF PREFERRED EMBODIMENTS

Hereinafter, the chemical substance concentrator and the chemical substance detector of an exemplary embodiment of the present disclosure will be described in detail with reference to the accompanying drawings. The exemplary embodiment below is described as a preferable example of the present disclosure, and therefore, it is to be understood that values, shapes, materials, components, a layout of components, and a connection configuration of the components shown in the descriptions below are mere an example and they are not to be construed as limitation on the technical scope of the present disclosure. Therefore, of the components described in the exemplary embodiment below, a component that has no description in an independent claim showing the most significant concept of the present invention will be described as any component.

Besides, the drawings are schematic views, and therefore they are not necessarily depicted with exact expression. Throughout the drawings, like parts have similar reference marks and description thereof, when it overlaps with the previously provided one, will be omitted or simplified.

Figure 1:
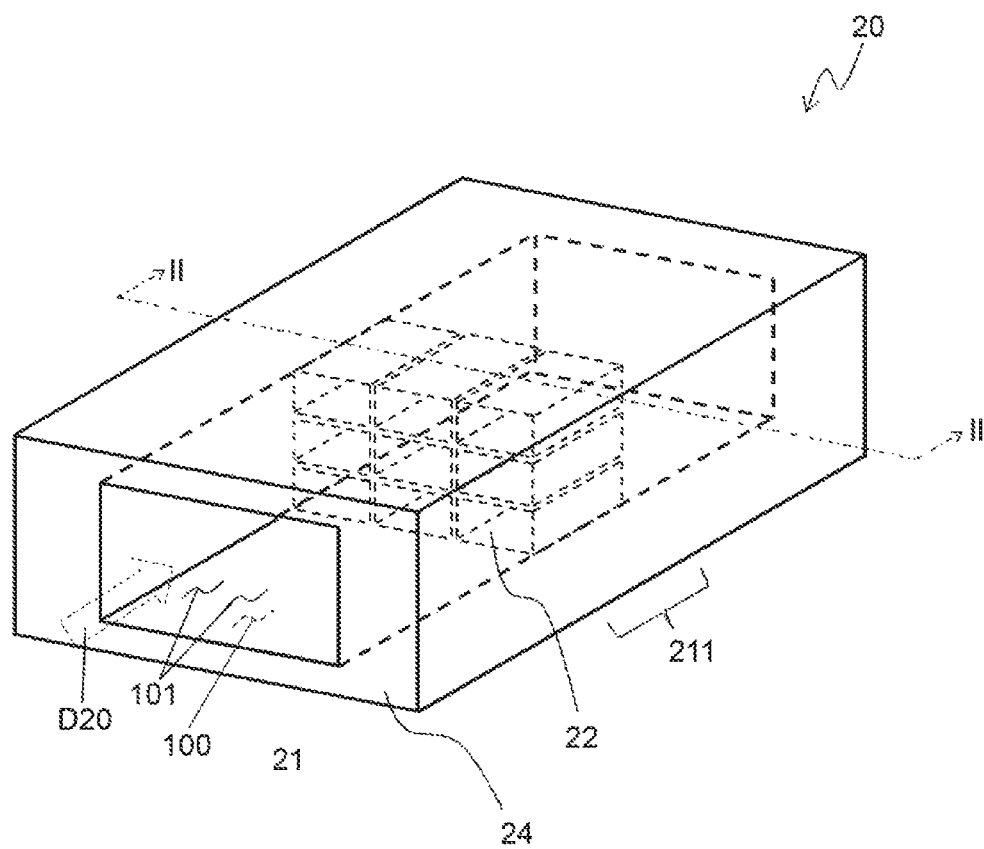
FIG. 1 is a perspective view of a chemical substance concentrator in accordance with an exemplary embodiment.

FIG. 1 is a perspective view of chemical substance concentrator 20 according to an exemplary embodiment. Chemical substance concentrator 20 concentrates chemical substance 101 contained in sample 100. Sample 100 in accordance with the embodiment is a gas. Concentration on chemical substance 101 is performed, for example, for increasing the concentration of chemical substance 101 as a pretreatment on sample 100 in a detection process.

Sample 100 may be, for example, aspirated air of humans and animals, plant emission, and exhaust emission from vehicles. Chemical substance 101 may be, for example, volatile organic compounds, such as a ketone group, an amine group, an alcohol group, an aromatic hydrocarbon group, an aldehyde group, an ester group, organic acid, hydrogen sulfide, methyl mercaptan, or disulfide.

Figure 2:
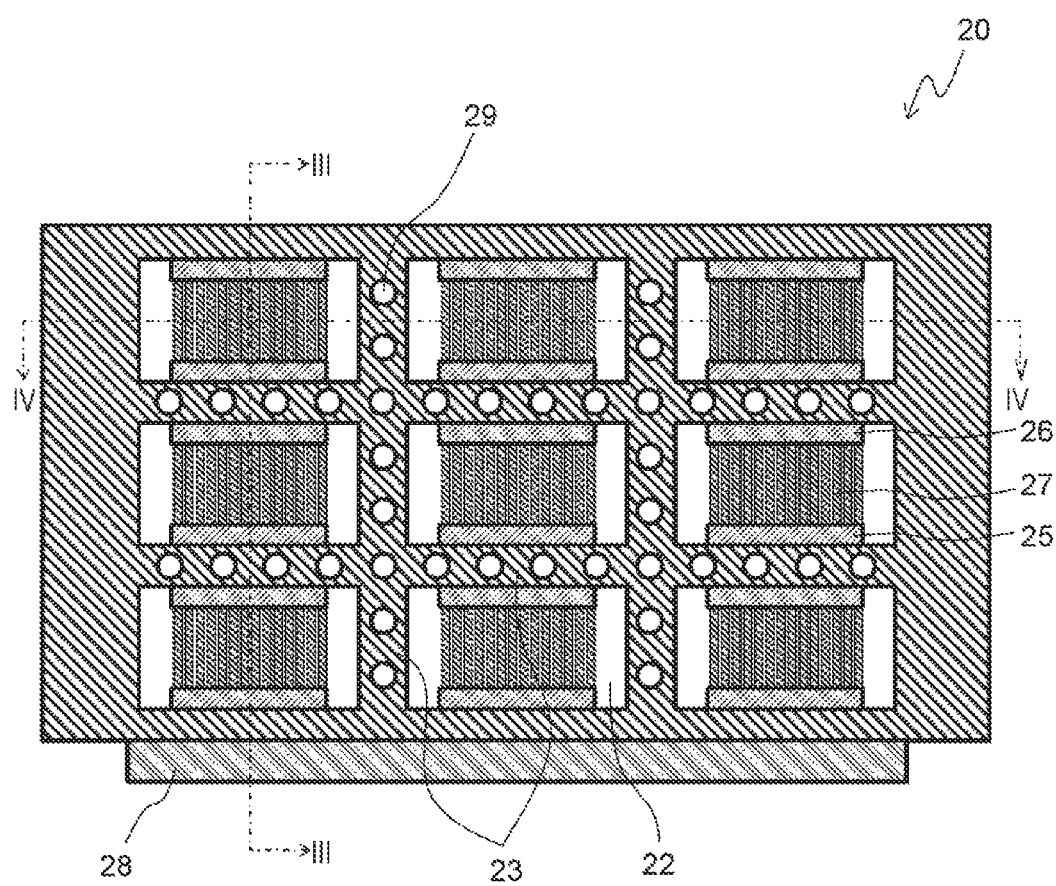
FIG. 2 is a cross-sectional view of the chemical substance concentrator at line II-II shown in FIG. 1.
Figure 3:
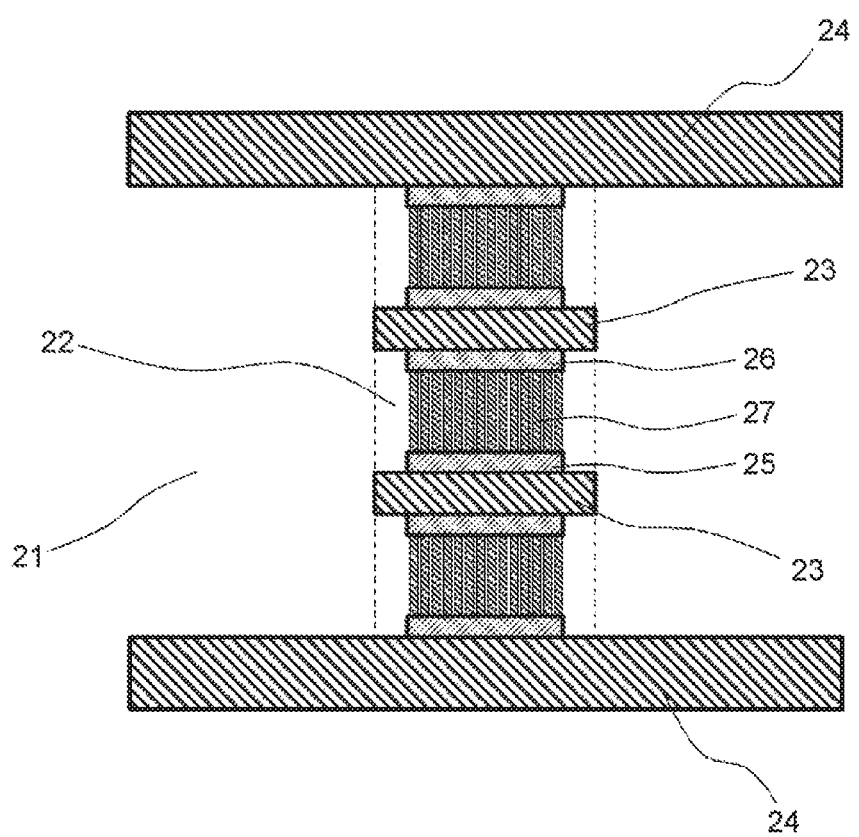
FIG. 3 is a cross-sectional view of the chemical substance concentrator at line III-III shown in FIG. 2.
Figure 4:
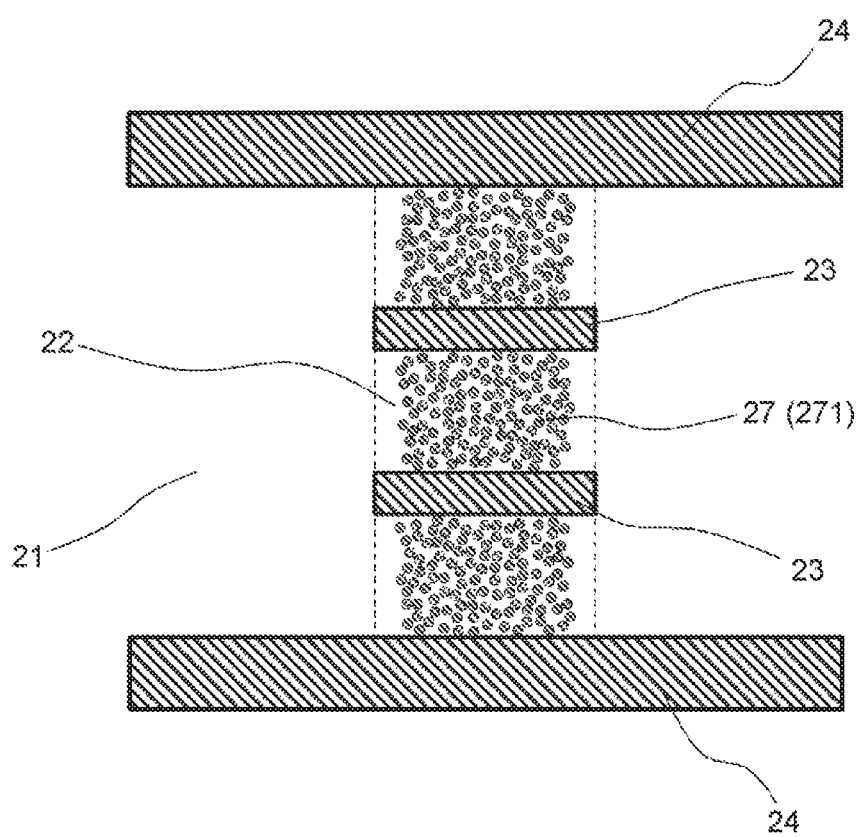
FIG. 4 is a cross-sectional view of the chemical substance concentrator at line IV-IV shown in FIG. 2.

FIG. 2 is a cross-sectional view of chemical substance concentrator 20 at line II-II shown in FIG. 1. FIG. 3 is a cross-sectional view of chemical substance concentrator 20 at line III-III shown in FIG. 2. FIG. 4 is a cross-sectional view of chemical substance concentrator 20 at lines IV-IV shown in FIG. 2.

Chemical substance concentrator 20 includes channel 21 allowing sample 100 containing chemical substance 101 to flow in flowing direction D20 in the channel, and cell wall 23 partitioning channel 21 into plural adsorption cells 22. Channel 21 is formed in substrate 24.

Substrate 24 is made of, for example, resin material, semiconductor material, or metal.

Figure 5:
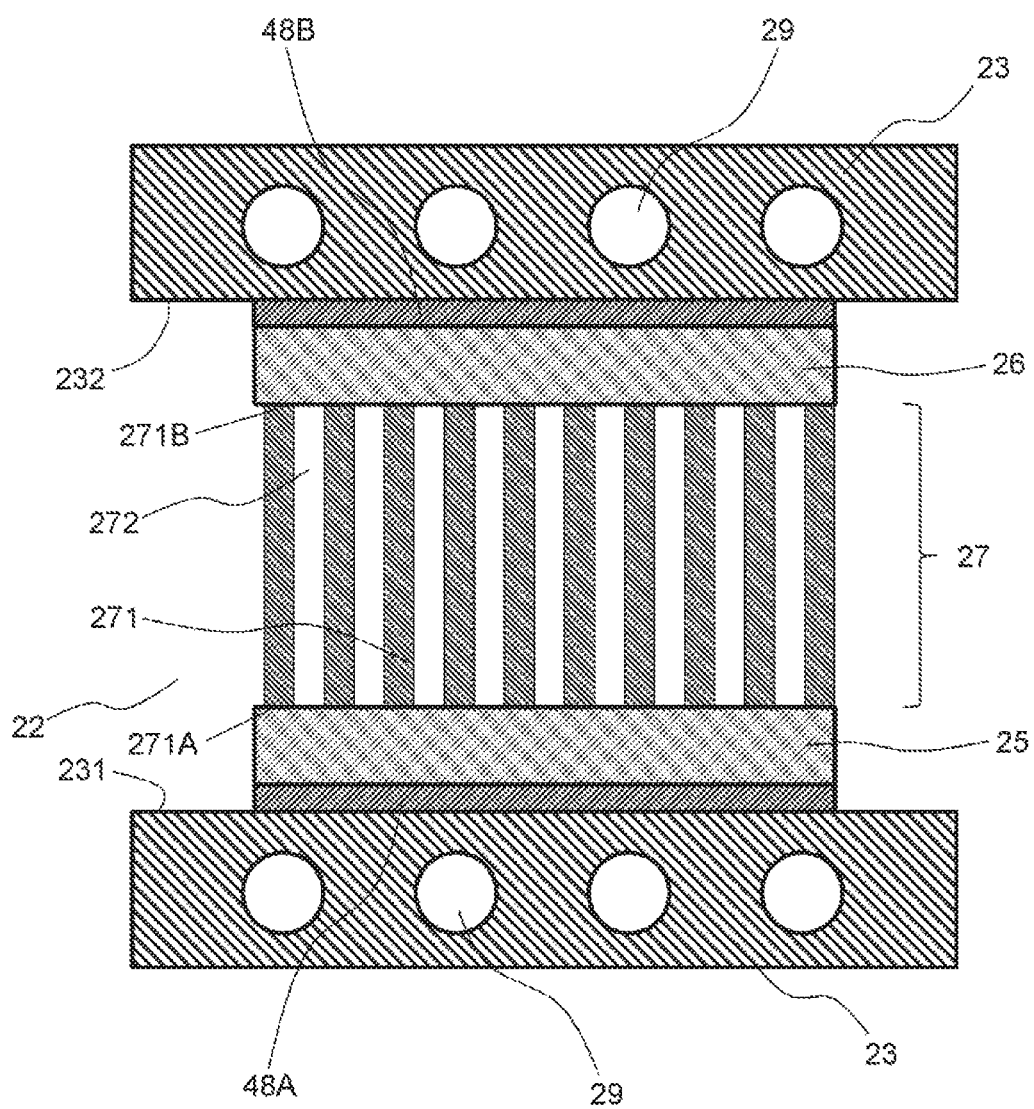
FIG. 5 is an enlarged cross-sectional view of the chemical substance concentrator in accordance with the embodiment.

FIG. 5 is an enlarged cross-sectional view of chemical substance concentrator 20, and schematically shows enlarged adsorption cell 22. The adsorption cells 22 are partitioned by cell wall 23 disposed in channel 21. Cell wall 23 of each of adsorption cells 22 has wall surfaces 231 and 232. Wall surface 231 faces wall surface 232 across adsorption cell 22.

Electrode 25 and 26 and adsorption device 27 are disposed inside of each adsorption cell 22.

Electrode 25 is disposed on wall surface 231. Electrode 26 is disposed on wall surface 232. Electrodes 25 and 26 are located apart from each other in adsorption cell 22. Electrodes 25 and 26 are made of conductive material, such as gold, copper, platinum, and carbon. Electrodes 25 and 26 may be made of the same material or may be made of different materials.

Adsorption device 27 adsorbs chemical substance 101 contained in sample 100.

Adsorption device 27 has conductivity and is disposed at a position contacting electrodes 25 and 26 such that electrodes 25 and 26 are electrically connected via adsorption device 27. Electrodes 25 and 26 are connected to a power-supply unit that supplies electric currents to electrodes 25 and 26.

Adsorption device 27 is an aggregation of nanowires 271 with conductivity. Nanowires 271 are made of, for example, conductive metal oxide. Space 272 is provided between nanowires 271. When gaseous sample 100 passes through space 272, chemical substance 101 contained in sample 100 is adsorbed to the surfaces of nanowires 271. Adsorption device 27 made of nanowires 271 has a large surface area, and accordingly, adsorbs chemical substance 101 efficiently.

Nanowire 271 has end 271A contacting electrode 25 and end 271B contacting electrode 26. Electric current is supplied to nanowire 271 via electrodes 25 and 26.

Adsorption device 27 is made of material that generates heat due to the electric current supplied thereto. That is, electric current supplied from electrodes 25 and 26 allows adsorption device 27 to generate Joule heat.

Conductive nanowire 271 is made of metal oxide, metal, carbon, or conductive material, such as silicon. The metal oxide may be, for example, $SnO_2$, $ZnO$, $In_2O_3$, $In_{2-x}Sn_xO_3$, (for example, $0.1 \leq x \leq 0.2$)), $NiO$, $CuO$, $TiO_2$, or $SiO_2$. The metal may be, Al, Ag, Au, Pd, or Pt. Nanowire 271 made of carbon is made of, for example, carbon nanotube.

Nanowire 271 may be made of resin having a surface coated with metal oxide. Coating the surface of nanowire 271 with conductive metal oxide allows adsorption device 27 to have conductivity.

As is described above, adsorption device 27 is made of a material that has conductivity and a resistance value enough for effectively generating self-heating by the Joule effect.

In the conventional adsorption-separation system described, chemical substance 101 receives heat from the thermally-conductive filament via the adsorption material. However, due to heat loss occurred during heat transfer via the adsorption material, chemical substance 101 is not efficiently heated. The inefficient heating of the conventional adsorption-separation system may cause poor desorption of chemical substance 101 that has been adsorbed to the adsorption material.

In chemical substance concentrator 20 according to the embodiment, adsorption device 27 generates heat to directly heat chemical substance 101 adsorbed to adsorption device 27. Chemical substance concentrator 20 thus decreases a heat loss in the heating process of chemical substance 101.

Chemical substance concentrator 20 has adsorption section 211 made of plural adsorption cells 22. Each of adsorption cells 22 is configured to adsorb and desorb chemical substance 101. Electrodes 25 and 26 disposed in each adsorption cell 22 are connected to the power-supply unit that supplies electric currents to electrodes 25 and 26.

In each of adsorption cells 22, the heat generated by adsorption device 27 allows chemical substance 101 to be desorbed from adsorption device 27. Therefore, chemical substance concentrator 20 adsorbs chemical substance 101 and then desorbs it efficiently and sufficiently from adsorption device 27, thereby efficiently concentrating chemical substance 101 contained in sample 100.

Channel 21 is partitioned into plural adsorption cells 22, and decreases the size of adsorption device 27. For example, in accordance with the embodiment, channel 21 is partitioned into three in a height direction in which nanowire 271 extends. The length of nanowire 271 disposed in channel 21 decreases to about one third of the length of a nanowire disposed in channel 21 with no partition. The length of adsorption cells 22 in the height direction may be the same or may be different. Besides, the length of adsorption cells 22 in a width direction perpendicular to the height direction may be the same or may be different.

Nanowire 271 is formed by a liquid-phase growth method or a vapor-phase growth method. In this case, nanowire 271 with large a length requires a long time for forming nanowire 271. That is, a chemical substance concentrator in which channel 21 is not partitioned into plural adsorption cells 22 has poor production efficiency.

In contrast, in chemical substance concentrator 20 according to the embodiment, channel 21 is partitioned into adsorption cells 22, and short nanowire 271 is disposed in each of adsorption cells 22. This configuration allows chemical substance concentrator 20 to decrease a time for production.

Nanowires 271 with large lengths also increase variations in the lengths and thicknesses of nanowires 271, preventing adsorption device 27 to from being determined to a predetermined size. The thicknesses and lengths of nanowires 271 influence the size of space 272 of adsorption device 27. Variations in size of nanowires 271 invite degradation of adsorption property of adsorption device 27.

The length of nanowire 271 influences power consumption required for heat generation of nanowire 271. Specifically, nanowire 271 with a large length increases resistance, which also increases power consumption required for heat generation.

Channel 21 partitioned into adsorption cells 22 each having nanowires 271 enhances the performance of adsorption device 27 and chemical substance concentrator 20. Therefore, chemical substance concentrator 20 preferably includes plural adsorption cells 22 each having nanowires 271. The length of nanowire 271 is preferably equal to or larger than 1 μm and equal to or smaller than 100 μm. The length of nanowires 271 disposed in single adsorption cell 22 of adsorption cells 22 is preferably the same as that of each of nanowires 271 disposed in other adsorption cells 22, but the length of nanowires 11 in certain adsorption cell 22 may be different from the length of nanowires 11 in other adsorption cells 22. The diameter of nanowire 271 is preferably equal to or larger than 10 nm and equal to or smaller than 1 μm. The diameter of nanowires 271 disposed in single adsorption cell 22 of adsorption cells 22 is preferably the same as that of nanowires 271 disposed in other adsorption cells 22, but the diameter in single adsorption cell 22 may be different from that in other adsorption cells 22. In each of adsorption cells 22, the lengths of the nanowires 271 are preferably the same, but may be different from each other. In each adsorption cell 22, the diameters of the nanowires 271 are preferably the same, but may be different from each other.

Chemical substance concentrator 20 may include cooling section 28 that cools adsorption device 27. Cooled adsorption device 27 efficiently adsorbs more chemical substance 101. Cooling section 28 is disposed, for example, on the lower surface of substrate 24 in which channel 21 is formed. Cooling section 28 is implemented by, for example, a Peltier device, an air-cooling device, and a water-cooling device.

Cooling section 28 can be disposed at an arbitrary position as long as it can cool adsorption device 27. For example, cooling section 28 may be disposed inside of channel 21 or inside of adsorption cell 22.

Cell wall 23 may have plural through-holes 29 therein extending in flowing direction D20 in which sample 100 flows.

Through-holes 29 allow sample 100 to pass through the through-holes, and decrease a pressure loss in chemical substance concentrator 20. Therefore, even if channel 21 has a high pressure loss, sample 100 flows in channel 21 with no interruption. Sample 100 may be supplied continuously to adsorption device 27 and allows more chemical substance 101 to be absorbed.

When sample 100 is supplied through channel 21 by pressure from outside, flow-velocity distribution occurs in a plane perpendicular to flow direction D20. To be specific, in a plane perpendicular to flow direction D20, the flow velocity near the center of channel 21 tends to be higher than that in a peripheral part of channel 21, i.e., near the wall of channel 21. through-holes 29 are formed in consideration of the above tendency. The diameters of through-holes 29 disposed near the wall of channel 21 is preferably smaller than that of through-holes 29 disposed near the center of channel 21 apart from the wall of channel 21. This configuration decreases the difference of flow velocities in a plane perpendicular to flow direction D20, and more preferably allows the flow velocities in the plane perpendicular to flow direction D20 to be uniform.

As another method for decreasing the difference of the flow velocities in the plane perpendicular to flow direction D20, the number of through-holes 29 per unit area disposed near the wall of channel 21 may be larger than that disposed near the center of channel 21 apart from the wall of channel 21. Further, the number of through-holes 29 per unit area and the diameters of the through-holes may be both changed. Specifically, compared to through-holes 29 disposed near the center of channel 21, through-holes 29 near the wall of channel 21 may be greater in number per unit area and in diameter. As described above, through-holes 29 are disposed such that sample 100 evenly spreads over adsorption cells 22.

Through-holes 29 are formed in channel 21 to decrease a pressure loss when gaseous sample 100 flows through channel 21. Therefore, when channel 21 has a sufficiently small pressure loss, chemical substance concentrator 20 does not necessarily have through-holes 29 in cell wall 23.

Figure 6:
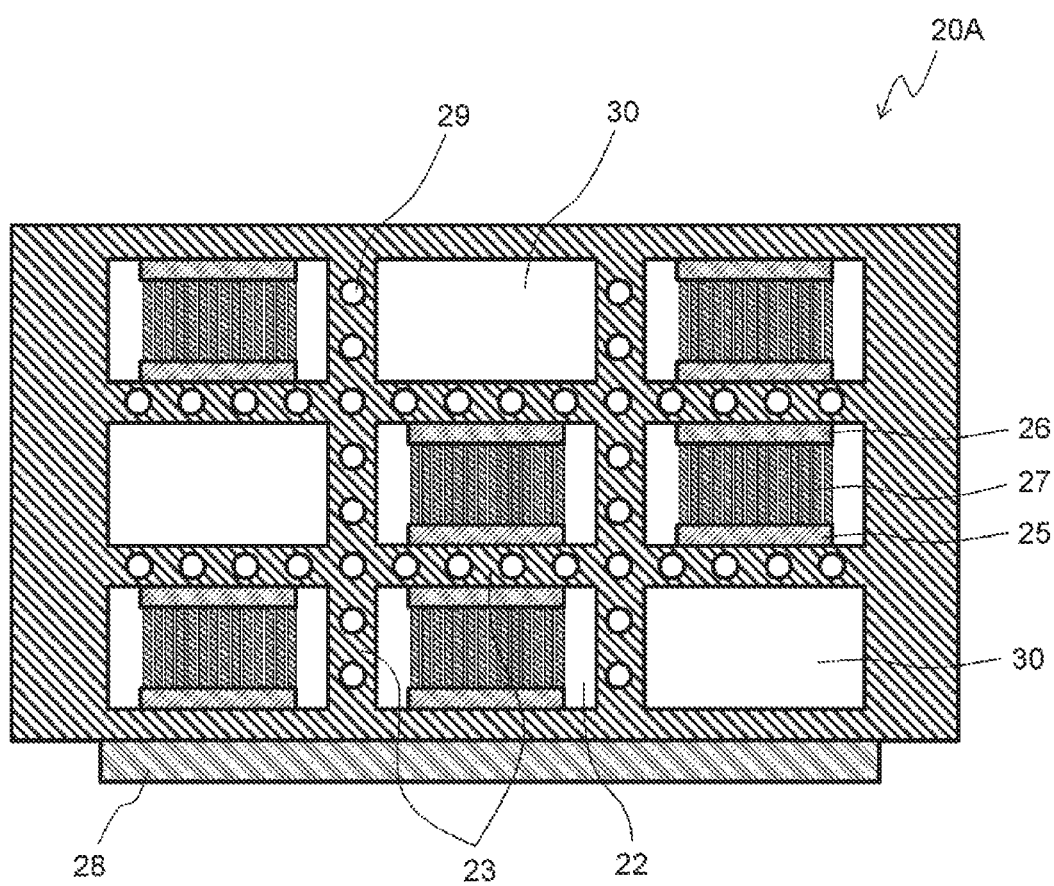
FIG. 6 is a cross-sectional view of another chemical substance concentrator in accordance with the embodiment.

FIG. 6 is a cross-sectional view of another chemical substance concentrator 20A in accordance with the embodiment. In FIG. 6, components identical to chemical substance concentrator 20 shown in FIGS. 1 to 5 are denoted by the same reference numerals. In chemical substance concentrator 20A, channel 21 is partitioned by cell wall 23 into plural adsorption cells 22 and plural hollow cells 30. None of electrodes 25 and 26 and adsorption device 27 is disposed inside of hollow cells 30. Hollow cells allowing sample 100 to pass through the cells thus decrease a pressure loss in channel 21 of chemical substance concentrator 20A. That is, hollow cells 30 functions similarly to through-holes 29 of chemical substance concentrator 20 shown in FIGS. 1 to 5.

Chemical substance concentrator 20A may further have through-holes 29 in chemical substance concentrator 20 shown in FIGS. 1 to 5.

Figure 7:
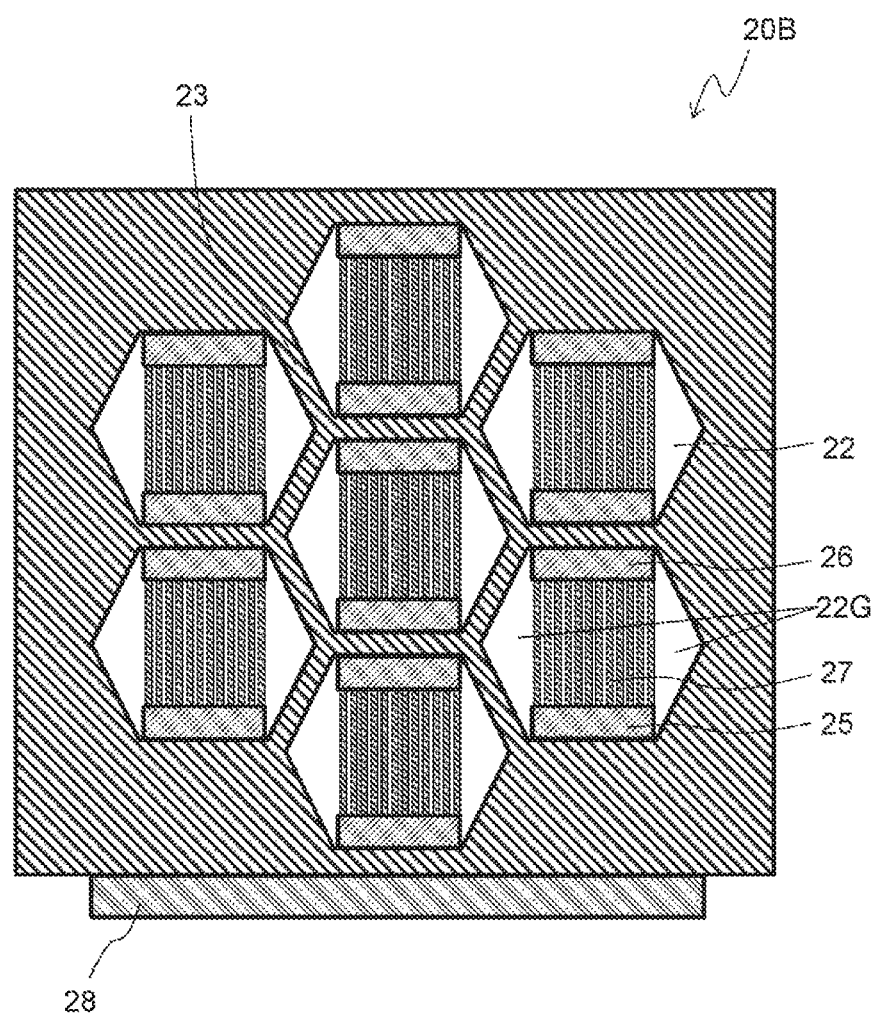
FIG. 7 is a cross-sectional view of still another chemical substance concentrator in accordance with the embodiment.

FIG. 7 is a cross-sectional view of still another chemical substance concentrator 20B in accordance with the embodiment. In FIG. 7, components identical to those of chemical substance concentrator 20 shown in FIGS. 1 to 5 are denoted by the same reference numerals. In chemical substance concentrator 20B, plural adsorption cells 22 are arranged to constitute a honeycomb structure. Adsorption cells 22 having the honeycomb structure allow sample 100 flowing through channel 21 to uniformly spread over adsorption cells 22. That is, the structure is prevented from causing uneven distribution in the amount of chemical substance 101 adsorbed to each adsorption cell 22. As a result, chemical substance concentrator 20B efficiently adsorbs chemical substance 101. Besides, clearance 22G through which sample 100 passes is formed between adsorption device 27 and the wall surface of adsorption cell 22. This configuration allows adsorption cells 22 of the honeycomb structure to decrease the pressure loss in channel 21 when sample 100 flows through the channel.

The material of adsorption device 27 is not necessarily nanowire 271. For example, adsorption device 27 may be made of a porous body with conductivity. The porous body is made of, for example, a material the same as that of the nanowire. Adsorption device 27 may be made of a single material or may be made of two or more kinds of material.

Figure 8:
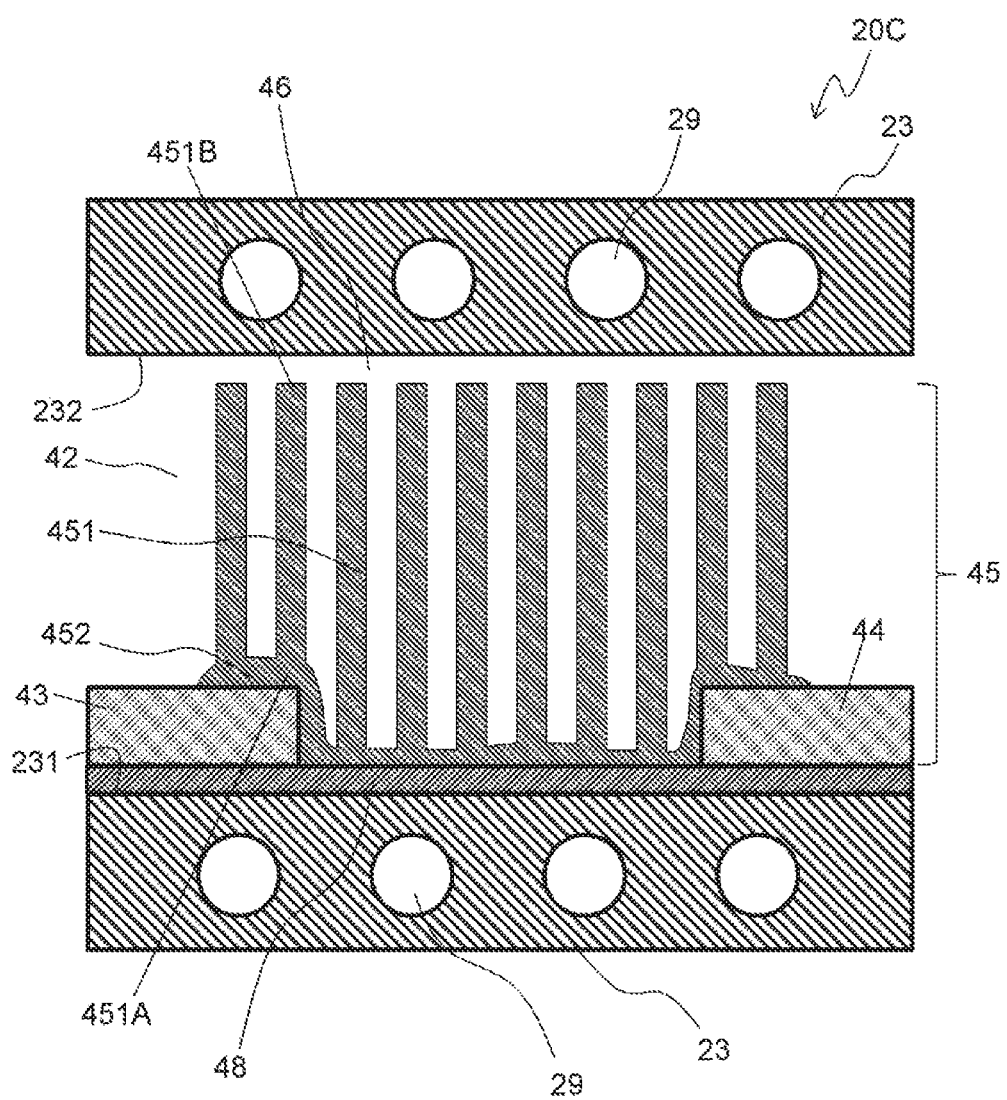
FIG. 8 is an enlarged cross-sectional view of a further chemical substance concentrator in accordance with the embodiment.

FIG. 8 is an enlarged cross-sectional view of further chemical substance concentrator 20C in accordance with the embodiment. In FIG. 8, components identical to those of chemical substance concentrator 20 shown in FIGS. 1 to 5 are denoted by the same reference numerals. Chemical substance concentrator 20C shown in FIG. 8 is partitioned into plural adsorption cells 42, instead of plural adsorption cells 22 of channel 21 of chemical substance concentrator 20 shown in FIGS. 1 to 5.

Adsorption cells 42 are partitioned by cell wall 23. Cell wall 23 has wall surfaces 231 and 232 facing each other.

In adsorption cell 42, electrodes 43 and 44 and adsorption device 45 are disposed on wall surface 231. That is, electrodes 43 and 44 and adsorption device 45 are disposed on the same plane of cell wall 23 forming adsorption cell 42. Electrodes 43 and 44 are arranged in a direction perpendicular to flow direction D20.

The structure above allows electrode 43 and adsorption device 45 to have electrical connection with stability, and also allows electrode 44 and adsorption device 45 to have electrical connection with stability. This enhances reliability of chemical substance concentrator 20C. Further, forming electrodes 43, 44, and adsorption device 45 on the same plane allows chemical substance concentrator 20C to be produced by a simple manufacturing process.

Nanowire 451 has end 451A and end 451B opposite to end 451A. Nanowire 451 extends between wall surfaces 231 and 232 in a direction crossing wall surfaces 231 and 232. In accordance with the embodiment, nanowire 451 extends in a direction substantially perpendicular to wall surfaces 231 and 232. End 451A of nanowire 451 is closer to wall surface 231 than end 451B while end 451B is closer to wall surface 232 than end 451A. End 451A of nanowire 451 is connected to electrodes 43 and 44. Nanowires 451 are partly connected with each other to constitute joint section 452 at ends 451A of nanowires 451 closer to wall surface 231. This configuration allows an electric current to be supplied along wall surface 231 to nanowire 451. Joint section 452 may not be necessarily close to wall surface 231. For example, joint section 452 at which plural nanowires 451 are partly connected with each other may be disposed close to wall surface 232 or disposed at a middle between end 451A of nanowire 451 and end 451B of nanowire 451.

Space 46 is formed between adsorption device 45 and wall surface 232, so that adsorption device 45 is apart from wall surface 232, i.e., does not contact wall surface 232. Space 46 prevents generation of heat loss due to heat transfer from adsorption device 45 to wall surface 232.

Electrodes 43 and 44 may be arranged in flow direction D20 of channel 21.

Chemical substance concentrator 20C may include heat-insulating layer 48 between wall surface 231 and each of electrodes 43 and 44. Similarly, as shown in FIG. 5, chemical substance concentrator 20 may include heat-insulating layer 48B between electrode 26 and wall surface 232, and include heat-insulating layer 48A between electrode 25 and wall surface 231. Heat-insulating layer 48A may be formed between adsorption device 27 and wall surface 231. Heat-insulating layers 48A and 48B decrease the heat transferred from adsorption device 27 (45) to wall surfaces 231 and 232, and suppress the heat loss accordingly.

Figure 9:
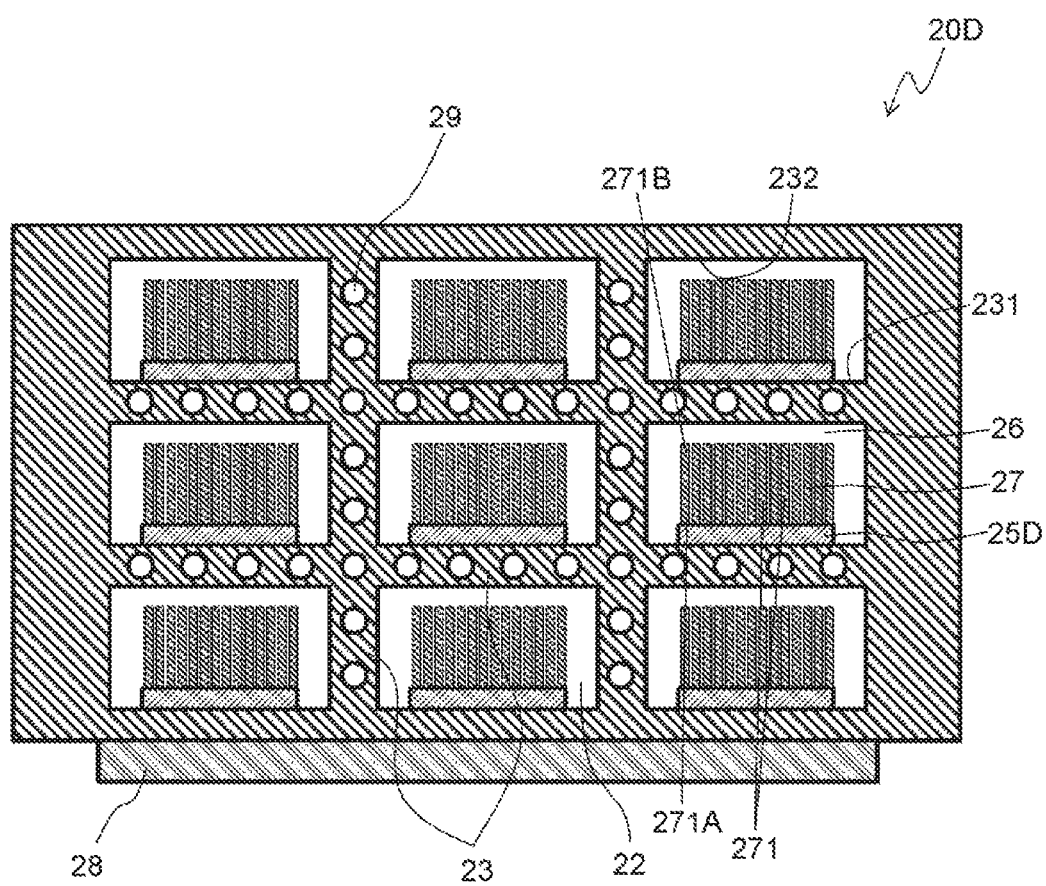
FIG. 9 is a cross-sectional view of a further chemical substance concentrator in accordance with the embodiment.

FIG. 9 is a cross-sectional view of further chemical substance concentrator 20D in accordance with the embodiment. In FIG. 9, components identical to those of chemical substance concentrator 20 shown in FIGS. 1 to 5 are denoted by the same reference numerals. Chemical substance concentrator 20D shown in FIG. 9 includes heating section 25D disposed on wall surface 231 instead of electrodes 25 and 26 of chemical substance concentrator 20 shown in FIG. 1 through FIG. 5. Heating section 25D is disposed in each of adsorption cells 22 to heat adsorption device 27. Nanowire 271 of adsorption device 27 contacts heating section 25D. Heating section 25D is made of, for example, an electrode pattern of platinum. Adsorption device 27 (nanowire 271) is apart from wall surface 232 of adsorption cell 22.

In chemical substance concentrator 20D shown in FIG. 9, nanowire 271 of adsorption device 27 is heated by heating section 25D so as to allow the chemical substance adsorbed to adsorption device 27 to be desorbed. Adsorption device 27 (nanowire 271) of chemical substance concentrator 20D is not necessarily a self-heating material, which increases material selections of adsorption device 27.

Figure 10:
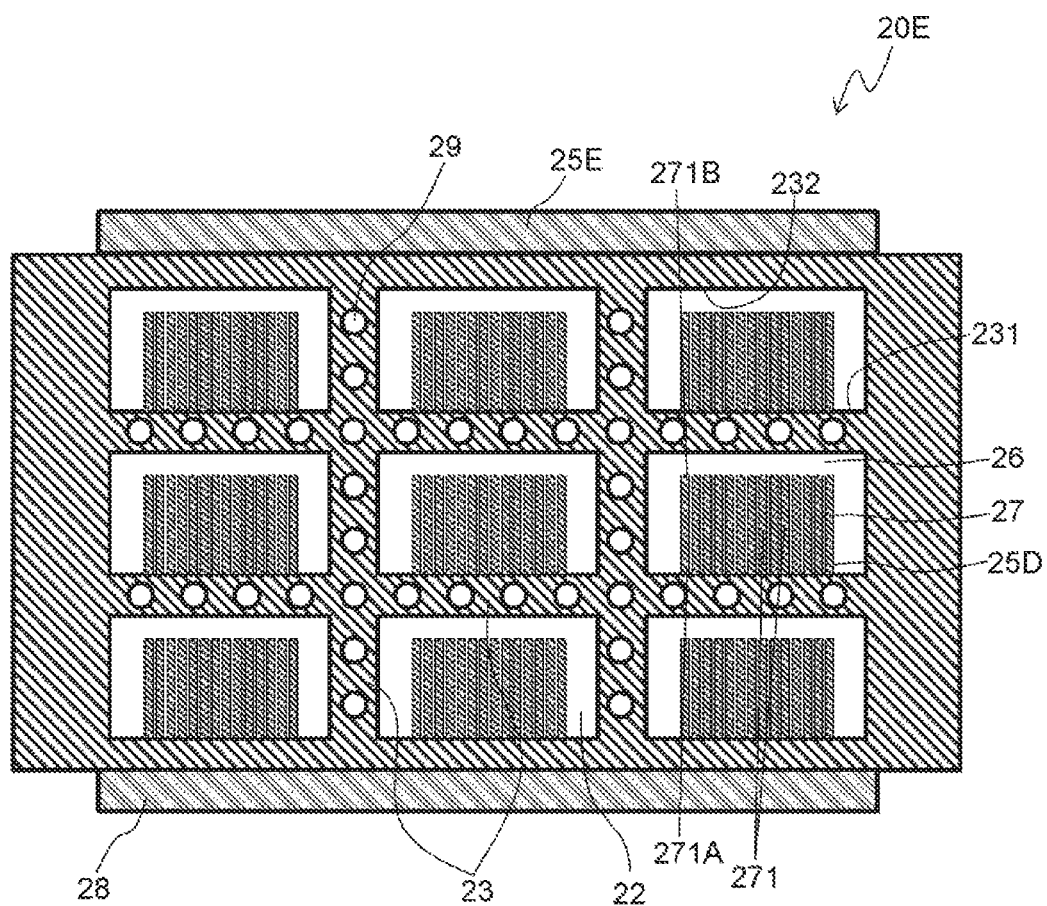
FIG. 10 is a cross-sectional view of a further chemical substance concentrator in accordance with the embodiment.

FIG. 10 is a cross-sectional view of further chemical substance concentrator 20E in accordance with the embodiment. In FIG. 10, components identical to those of chemical substance concentrator 20 shown in FIGS. 1 to 5 are denoted by the same reference numerals. Chemical substance concentrator 20E shown in FIG. 10 include heating section 25E formed on substrate 24 disposed outside of adsorption cells 22 instead of electrodes 25 and 26 of chemical substance concentrator 20 shown in FIGS. 1 to 5. Heating section 25E is configured to heat adsorption device 27 (nanowire 271) via substrate 24. Nanowire 271 of adsorption device 27 contacts wall surface 231. Heating section 25E is made of, for example, an electrode pattern made of platinum. Adsorption device 27 (nanowire 271) is apart from wall surface 232 of adsorption cell 22.

In chemical substance concentrator 20E shown in FIG. 10, nanowire 271 of adsorption device 27 is heated by heating section 25E via substrate 24 so as to allow the chemical substance adsorbed to adsorption device 27 to be desorbed. Adsorption device 27 (nanowire 271) of chemical substance concentrator 20E is not necessarily a self-heating material, which increases material selections of adsorption device 27.

In the case that nanowire 271 is formed by a liquid-phase growth method, nanowire 271 hardly has a large length. In chemical substance concentrator 20E shown in FIG. 10, adsorption cells 22 is arranged such that nanowire 271 is stacked in the height direction in which nanowire 271 grows.

Figure 11A:
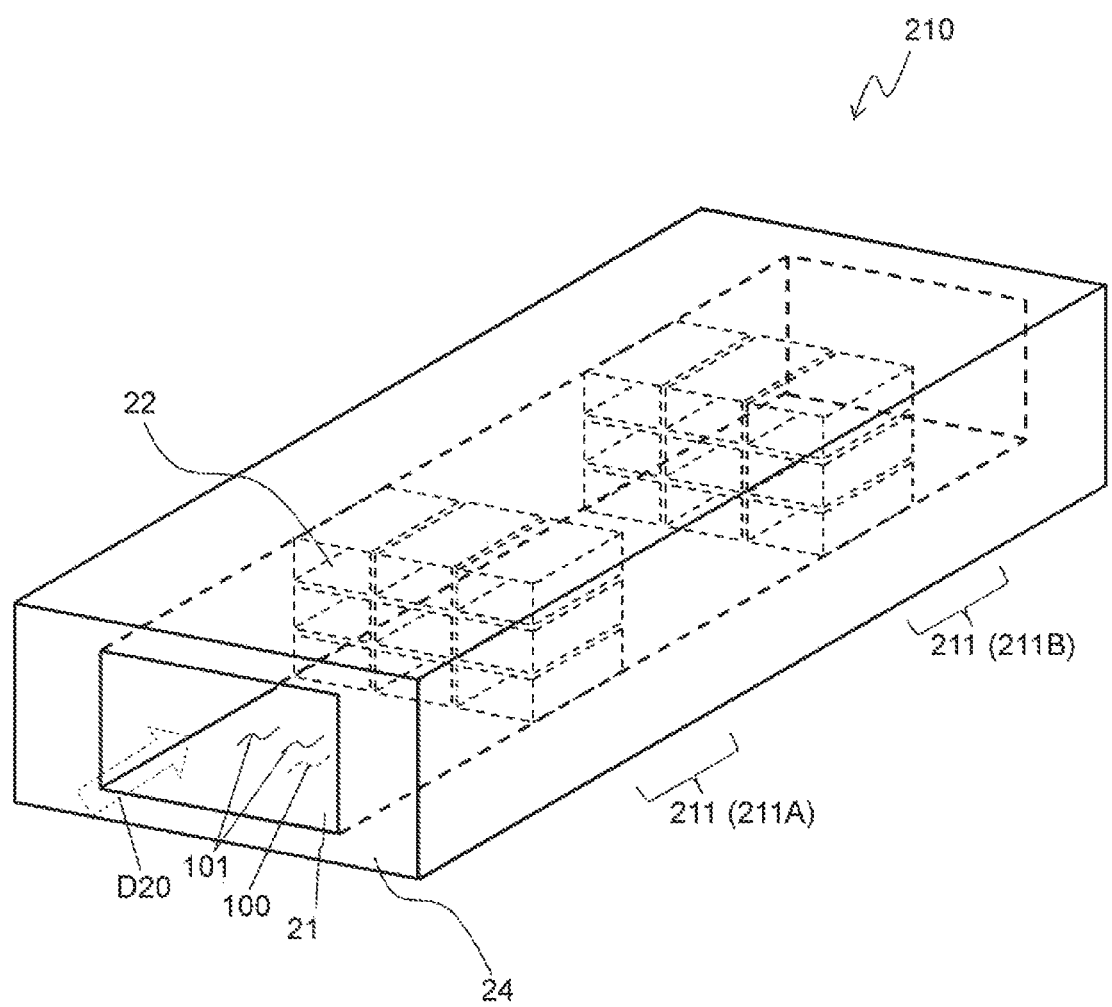
FIG. 11A is a perspective view of a further chemical substance concentrator in accordance with the embodiment.

FIG. 11A is a perspective view of further chemical substance concentrator 210 in accordance with the embodiment. In FIG. 11A, components identical to those of chemical substance concentrator 20 shown in FIGS. 1 to 5 are denoted by the same reference numerals.

Chemical substance concentrator 210 includes plural adsorption sections 211 (211A and 211B) disposed in channel 21. Each of adsorption sections 211A and 211B includes plural adsorption cells 22. Adsorption sections 211A and 211B are arranged with a distance between the adsorption sections in channel 21 in flowing direction D20 of gaseous sample 100. Sample 100 flows in flowing direction D20. Chemical substance concentrator 210 includes adsorption sections 211A and 211B, and allows a large amount of chemical substance 101 to be adsorbed by plural adsorption sections 211A and 211B, accordingly.

The material of adsorption device 27 of adsorption section 211A may be different from that of adsorption device 27 of adsorption section 211B. The type of chemical substance 101 adsorbed to adsorption device 27 depends on the material of adsorption device 27. That is, in the case that chemical substance concentrator 210 includes adsorption sections 211A and 211B made of different materials, the types of chemical substance 101 can be differentiate between adsorption sections 211A and 211B. This configuration allows chemical substance concentrator 210 to concentrate a lot of different kinds of chemical substance 101.

A mixer that stirs sample 100 may be disposed between adsorption sections 211A and 211B. The mixer may preferably be an in-line mixer, a helical mixer, a magnetic stirrer, a fan, an ultrasonic mixer, or a collision wall. The composition of chemical substance 101 contained in sample 100 can cause spatially or temporally nonuniformity in a latter part of adsorption section 211A. The nonuniformity can be eliminated by a mixer disposed between adsorption sections 211A and 211B so as to stir sample 100.

Figure 11B:
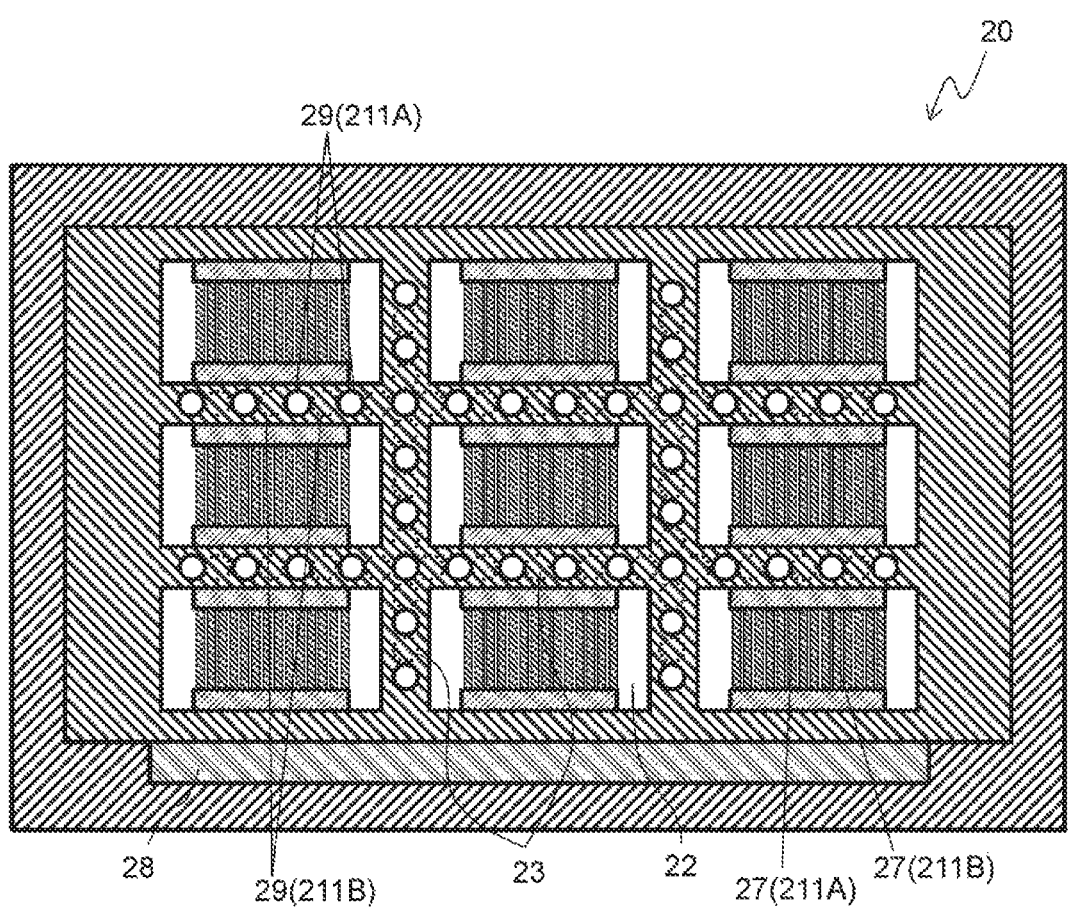
FIG. 11B is a cross-sectional view of the chemical substance concentrator shown in FIG. 11A.

FIG. 11B is a cross-sectional view of chemical substance concentrator 210 viewing in flowing direction D20. FIG. 11B shows a cross section of adsorption section 211A, and particularly, shows through-holes 29 of adsorption section 211B. Viewing in flow direction D20, plural through-holes 29 formed in adsorption section 211A may not be preferably aligned to plural through-holes 29 formed in adsorption section 211B. This configuration prevents sample 100 passing through through-holes 29 of adsorption section 211A from passing through through-holes 29 of adsorption section 211B. Therefore, in chemical substance concentrator 210, a large amount of sample 100 contacts adsorption device 27, and allows a large amount of chemical substance 101 to be adsorbed to adsorption device 27 accordingly. The diameters of through-holes 29 may be the same, or may be different from each other.

Figure 12:
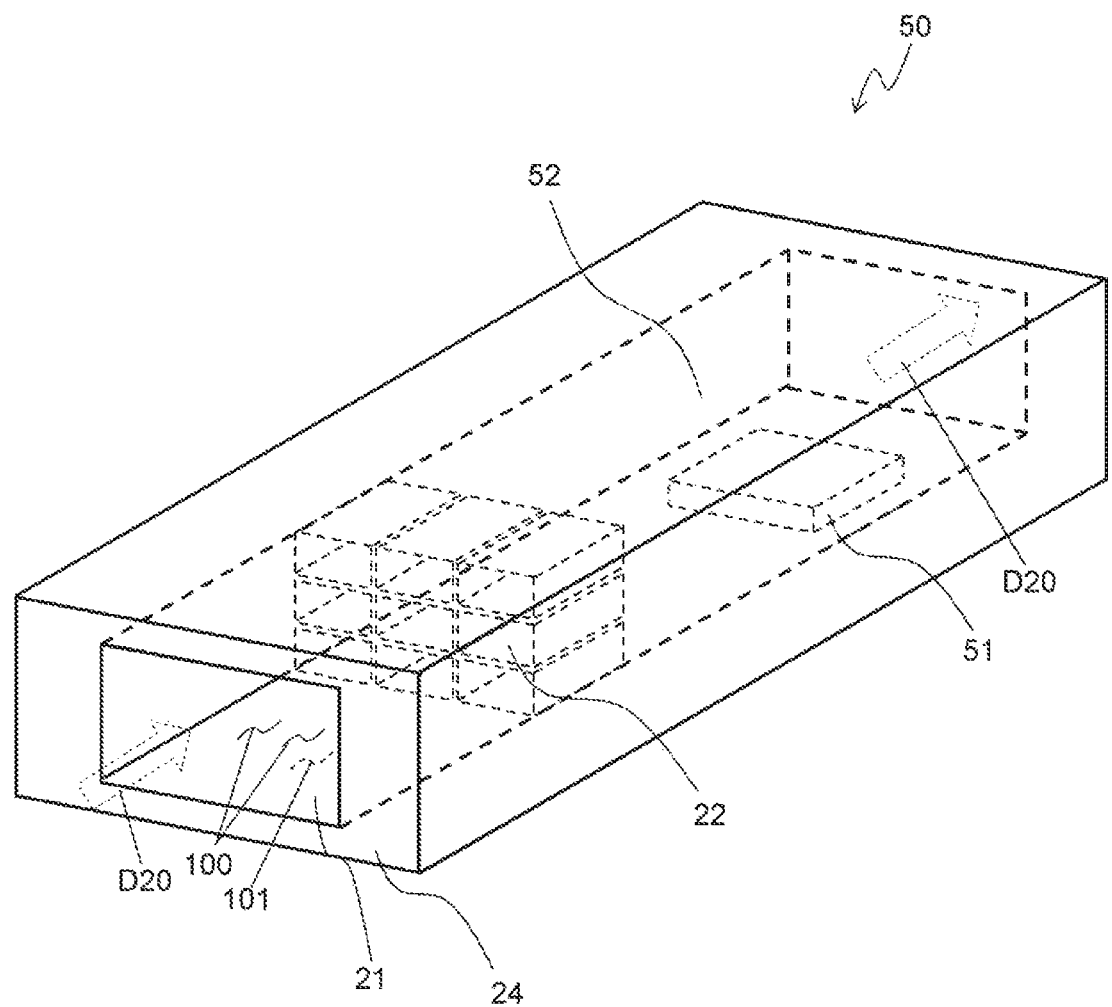
FIG. 12 is a perspective view of a chemical substance detector in accordance with the embodiment.

FIG. 12 is a top perspective view of chemical substance detector 50 in accordance with the embodiment. Gaseous sample 100 flows in flowing direction D20.

Chemical substance detector 50 includes detection element 51 disposed on a latter part of chemical substance concentrator 20, i.e., disposed on the downstream side of flowing direction D20. Detection element 51 may be implemented by, for example, a biosensor employing a surface acoustic wave element, an electrical-resistance change element, a quartz crystal microbalance; or a field-effect transistor, a near-infrared spectroscopic sensor, a terahertz spectroscopic sensor, or an optical sensor.

The chemical substance is concentrated in chemical substance concentrator 20, and then, is detected by detection element 51 of chemical substance detector 50. Detection element 51 is disposed in channel 52 connected to channel 21 including plural adsorption cells 22. That is, chemical substance 101 which is adsorbed to adsorption cells 22 and then desorbed from them is detected by detection element 51 disposed on a latter p art.

A mixer that stirs sample 100 may be disposed on the former part and/or the latter part of plural adsorption cells 22. The mixer may be implemented by an in-line mixer, a helical mixer, a magnetic stirrer, a fan, an ultrasonic mixer, or a collision wall.

Chemical substance 101 may be carried to the plurality of adsorption cells 22 by pressure from outside, for example, the pressure generated by a pump and a fan. Chemical substance 101 may be carried to plural adsorption cells 22 by diffusion or convection. Chemical substance 101 which is adsorbed to adsorption cells 22 and then desorbed from them may be carried by diffusion or convection to detection element 51. In chemical substance detector 50, detection element 51 may be disposed on the former part of chemical substance concentrator 20 on a side opposite to flowing direction D20.

From a standpoint of detection sensitivity, the distance between detection element 51 and each of plural adsorption cells 22 may preferably be short. Adsorption cells 22 may contact detection element 51. Chemical substance detector 50 may include plural detection elements 51. Detection element 51 may be disposed on an upper, bottom, or side surface of channel 52.

Prior to detection by chemical substance detector 50, chemical substance 101 contained in sample 100 is concentrated by chemical substance concentrator 20. Therefore, chemical substance detector 50 according to the embodiment detects chemical substance 101 with high sensitivity even if chemical substance detector 50 detects a low concentration or a small amount of chemical substance 101.

Although a chemical substance concentrator and a chemical substance detector of one aspect or a plurality of aspects have been described so far based on the exemplary embodiment, the present disclosure is not limited to the embodiment. As long as not departing from the scope of the present disclosure, a structure in which various modifications as an idea of those skilled in the art is applied to the structure of the exemplary embodiment, or a structure formed as a combination of components described in the different embodiments may be included in the scope of one aspect or a plurality of aspects.

REFERENCE MARKS IN THE DRAWINGS

100 sample
101 chemical substance
20, 210 chemical substance concentrator
21, 52 channel
22, 42 adsorption cell
211 adsorption section
23 cell wall
231 wall surface (first wall surface)
232 wall surface (second wall surface)
24 substrate
25, 43 electrode (first electrode)
26, 44 electrode (second electrode)
27, 45 adsorption device
271, 451 nanowire
452 joint section
272 space
28 cooling section
29 through-hole
30 hollow cell
46 space
48A, 48B heat-insulating layer
50 chemical substance detector
51 detection element

The invention claimed is:

1. A chemical substance concentrator comprising:
   a channel allowing a sample containing a chemical substance to flow in a flowing direction in the channel; and
   a cell wall partitioning the channel into a plurality of adsorption cells,
   wherein each of the plurality of adsorption cells includes:
      a first electrode disposed on the cell wall;
      a second electrode disposed on the cell wall while being apart from the first electrode; and
      an adsorption device that adsorbs the chemical substance,
   wherein the adsorption device contains metal oxide,
   wherein the absorption device is disposed at a position contacting the first electrode and the second electrode such that the first electrode is electrically connected to the second electrode via the adsorption device,
   wherein a portion of the cell wall between the plurality of adsorption cells has a through-hole therein extending in the flowing direction, the through-hole decreasing a pressure loss,
   wherein the adsorption device includes a plurality of nanowires,
   wherein surfaces of the plurality of nanowires are configured to allow the chemical substance to be adsorbed to the surfaces of the plurality of nanowires, and
   wherein the plurality of nanowires are not provided in the through-hole.

2. The chemical substance concentrator according to claim 1, further comprising a cooling section that cools the adsorption device.

3. The chemical substance concentrator according to claim 1, wherein the plurality of nanowires have lengths equal to or larger than 1 μm and equal to or smaller than 100 μm.

4. The chemical substance concentrator according to claim 1,
   wherein the cell wall has a first wall surface and a second wall surface at each adsorption cell of the plurality of adsorption cells, the first wall surface facing the each adsorption cell, the second wall surface facing the each adsorption cell and facing the first wall surface across the each adsorption cell,
   wherein the first electrode is disposed on the first wall surface,
   wherein the second electrode is disposed on the second wall surface, and
   wherein each of the plurality of nanowires has a first end contacting the first electrode and a second end contacting the second electrode.

5. The chemical substance concentrator according to claim 1, wherein the cell wall has a first wall surface and a second wall surface at each adsorption cell of the plurality of adsorption cells, the first wall surface facing the each adsorption cell, the second wall surface facing the each adsorption cell and facing the first wall surface via the each adsorption cell, and wherein the adsorption device, the first electrode, and the second electrode are disposed on the first wall surface.

6. The chemical substance concentrator according to claim 5, wherein the adsorption device is apart from the second wall surface.

7. The chemical substance concentrator according to claim 1, wherein the cell wall partitions the channel into the plurality of adsorption cells and a plurality of hollow cells in which none of the adsorption device, the first electrode, and the second electrode are disposed.

8. The chemical substance concentrator according to claim 1, wherein the plurality of adsorption cells constitute a honeycomb structure.

9. The chemical substance concentrator according to claim 1, further comprising a heat-insulating layer disposed between the cell wall and each of the first electrode and the second electrode.

10. The chemical substance concentrator according to claim 1, wherein the adsorption device desorbs the adsorbed chemical substance and concentrates the chemical substance in the sample.

11. A chemical substance detector comprising:
the chemical substance concentrator of claim 1; and
a detection element that detects the chemical substance,
wherein the chemical substance concentrator concentrates the chemical substance, and
wherein the detection element detects the concentrated chemical substance.

12. The chemical substance concentrator according to claim 1, wherein a longitudinal length of each of the plurality of nanowires is perpendicular to a longitudinal direction of the through-hole.

13. The chemical substance concentrator according to claim 1, wherein the portion of the cell wall between the plurality of adsorption cells has a plurality of through-holes therein extending in the flowing direction.

* * * * *